United States Patent
Huggins

(10) Patent No.: US 10,278,540 B1
(45) Date of Patent: May 7, 2019

(54) CONVEYOR TOASTER ASSEMBLY AND METHOD

(71) Applicant: P. Kenneth Huggins, Columbia, SC (US)

(72) Inventor: P. Kenneth Huggins, Columbia, SC (US)

( * ) Notice: Subject to any disclaimer, the term of this patent is extended or adjusted under 35 U.S.C. 154(b) by 0 days.

(21) Appl. No.: 15/957,981

(22) Filed: Apr. 20, 2018

(51) Int. Cl.
A47J 37/08 (2006.01)

(52) U.S. Cl.
CPC ........... *A47J 37/0857* (2013.01); *A47J 37/08* (2013.01)

(58) Field of Classification Search
CPC .. A47J 37/0857; A47J 37/0864; A47J 37/044; A47J 37/08
USPC .......................................... 99/386, 389, 391
See application file for complete search history.

(56) References Cited

U.S. PATENT DOCUMENTS

| | | | |
|---|---|---|---|
| 1,696,613 A | 8/1926 | Shroyer | |
| 1,708,522 A | 9/1927 | Pross, Jr. | |
| 2,182,229 A * | 12/1939 | Hamel | A47J 37/0857 198/804 |
| 2,188,309 A * | 1/1940 | Pentecost | A47J 37/0857 198/774.3 |
| 2,195,637 A * | 4/1940 | Anderson | A47J 37/0857 198/783 |
| 2,438,470 A * | 3/1948 | Wilson | A47J 37/0857 126/39 N |
| 3,262,383 A * | 7/1966 | Sturman | A47J 37/0857 99/386 |
| 3,517,605 A | 6/1970 | Hursch et al. | |
| 3,693,536 A | 9/1972 | Carville et al. | |
| 3,835,760 A | 9/1974 | Rekesius | |
| 4,286,509 A | 9/1981 | Miller et al. | |
| 5,253,564 A * | 10/1993 | Rosenbrock | A21B 1/40 99/326 |
| 5,673,610 A | 10/1997 | Stuck | |
| 5,746,116 A | 5/1998 | Smith | |
| 5,983,785 A | 11/1999 | Schreiner et al. | |
| 6,019,030 A | 2/2000 | Kettman | |
| 8,188,408 B2 * | 5/2012 | Claesson | A47J 37/045 219/387 |
| 2001/0016222 A1 * | 8/2001 | Tomsich | A47J 37/08 426/523 |
| 2008/0105134 A1 * | 5/2008 | Elston, III | D06F 39/005 99/325 |

(Continued)

*Primary Examiner* — Reginald Alexander
(74) *Attorney, Agent, or Firm* — Southeast IP Group, LLC; Thomas L. Moses

(57) ABSTRACT

A conveyor toaster includes a housing having an entry slot on one side for inserting a slice of bread, a conveying mechanism for transporting the slice of bread through the toasting chamber, at least one heating element for toasting the bread, and a second opening, or exit slot, on an opposite end of the housing for extracting the toast. Speed controls operate the speed of the conveyor mechanism, and heat controls determine the level of heat intensity. Windows are provided on a front and rear portion for viewing during a toasting operation. The toaster may include a remote control via smart phone, tablet or the like, and programmable default buttons allow a user to assign heat and speed intensities and variable sequences to the programmable button to capture a user's specific heating pattern, as desired. Other pre-programmed buttons may include other speed and temperature levels and sequences.

15 Claims, 3 Drawing Sheets

(56) References Cited

U.S. PATENT DOCUMENTS

2009/0175994 A1* 7/2009 Chung ............... A47J 37/0807
                                                    426/466
2010/0139497 A1   6/2010 Chung et al.
2010/0275789 A1   11/2010 Lee et al.
2015/0297030 A1* 10/2015 Everett, Jr. .......... H05B 1/0261
                                                    426/233

* cited by examiner

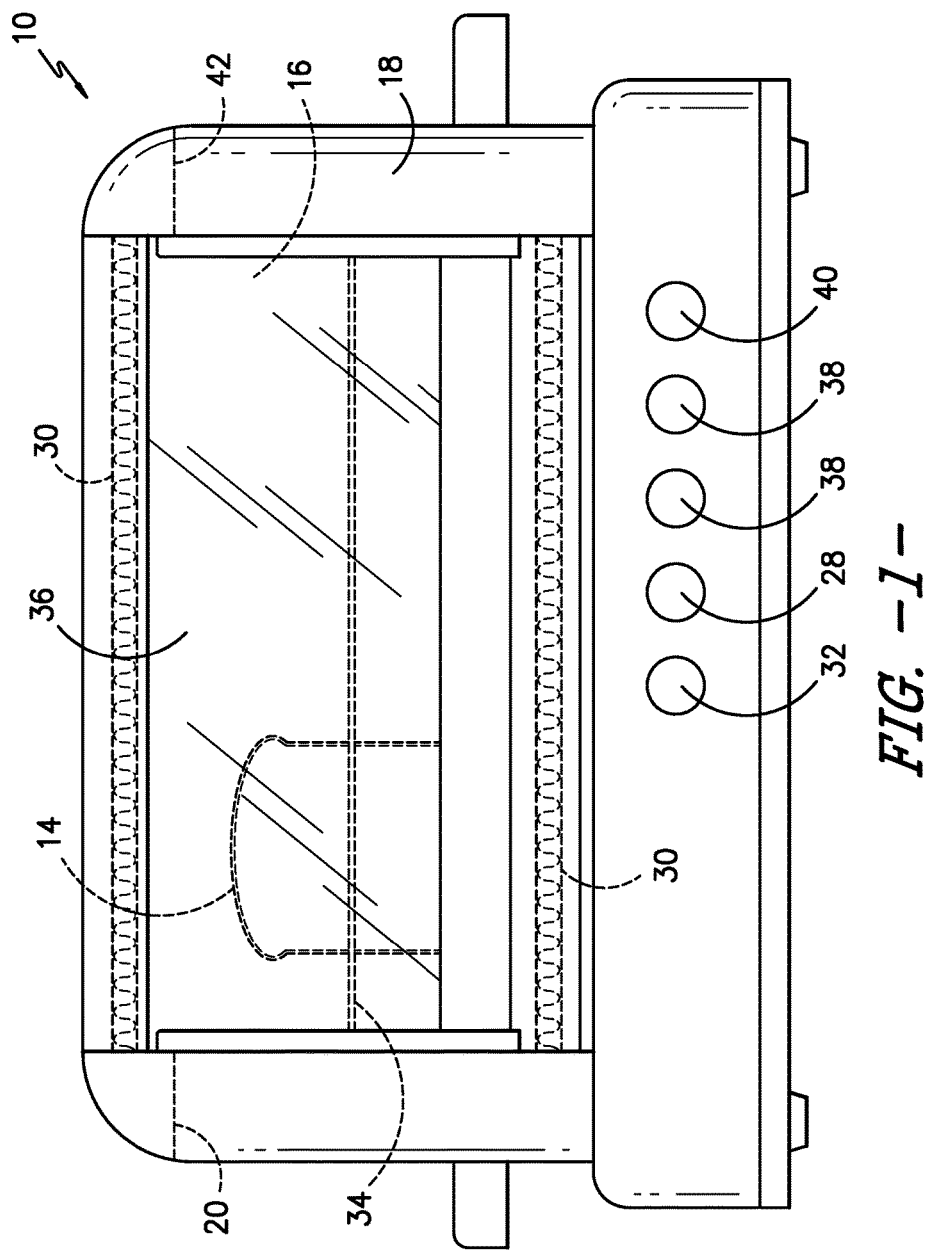

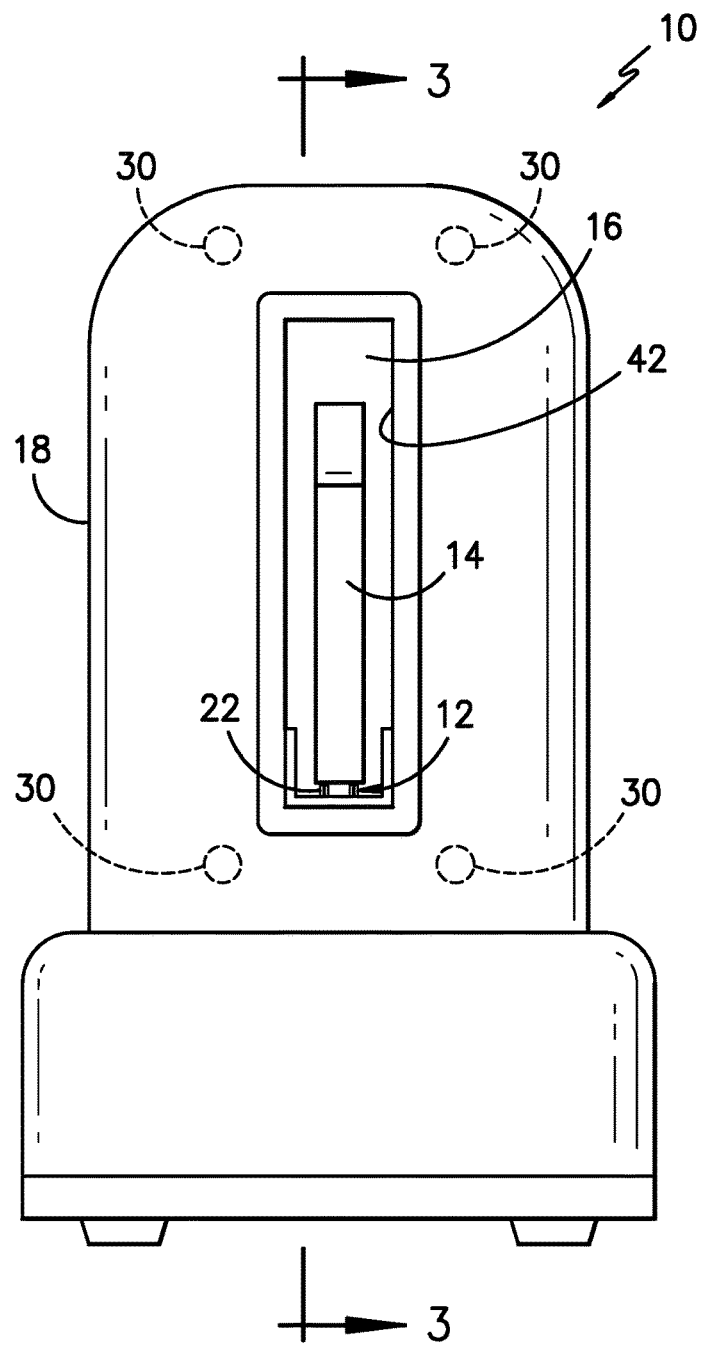
FIG. -2-

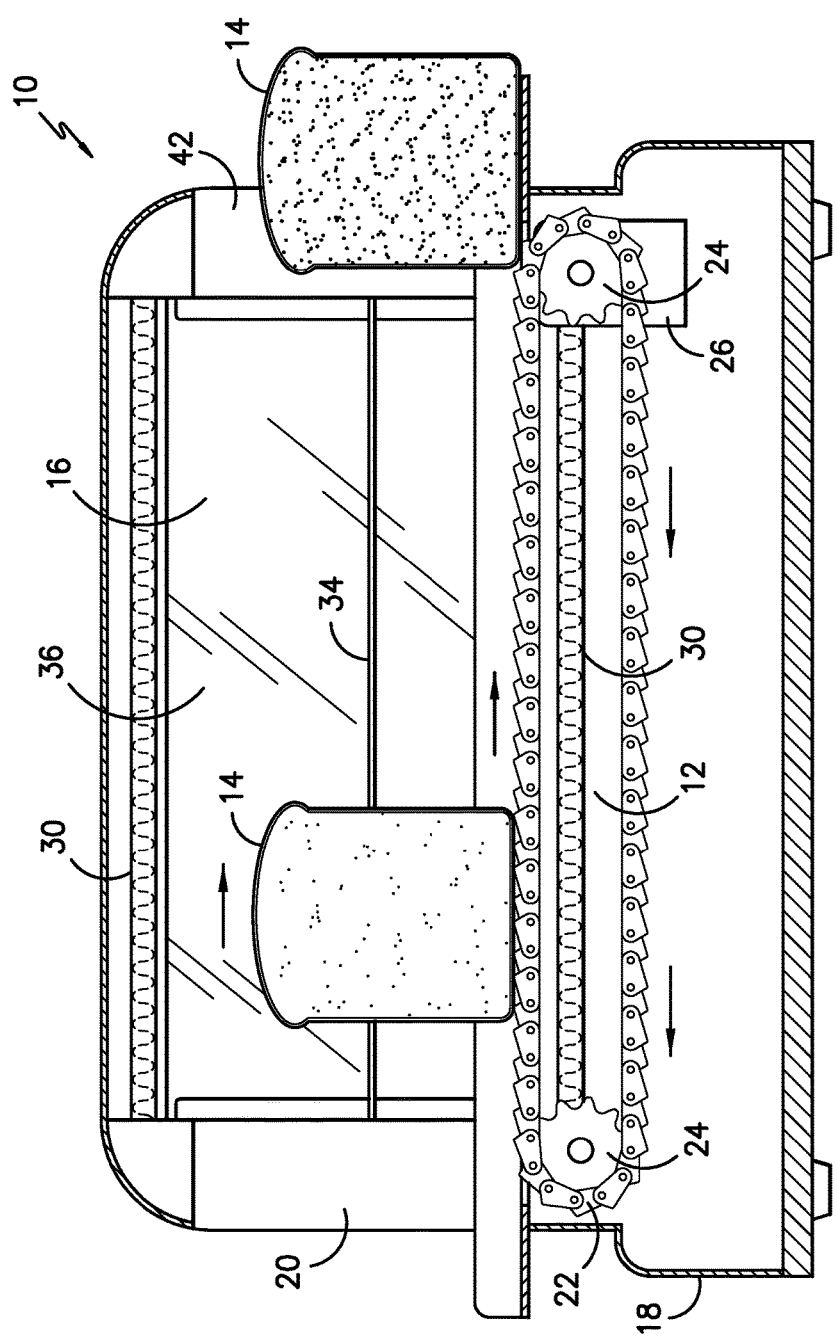
FIG. -3-

CONVEYOR TOASTER ASSEMBLY AND METHOD

FIELD OF THE INVENTION

The present invention relates generally to toasters. More specifically, the present invention includes a toaster having a conveyor mechanism for transporting bread through a toaster having means for heating and toasting the bread.

BACKGROUND OF THE INVENTION

Many different types of toasters have been manufactured and used all over the world for decades, ranging from small single or double slice home toasters to large commercial toasters. Toasters may be used to toast sliced bread, rolls, bagels, biscuits, and other similar food products.

One type of toaster is a conveyor toaster that continuously moves food prod products through the appliance. Generally, these conveyor toasters include a housing having a toasting cavity, a conveyor for moving the bread/toast through the toasting cavity, and one or more heating elements.

Various efforts have been made to develop conveyor toasters, and the following references show a few examples. These references are incorporated by reference herein, in their entireties:

U.S. Pat. No. 1,696,613: Toaster

A toaster includes a horizontal conveyor, the bread to be toasted being-placed on the conveyor at the front of the toaster and carried toward the rear in close proximity to suitable heating means, whereby the bread is toasted. At the rear of the toaster the bread is fed by the conveyor to means for returning it to the front of the toaster, this means being shown as an inclined slide. The toaster further includes means for regulating a draft of cooling air around the heating means whereby the generation of heat may be-regulated for different toasting operations and for light or heavy loads, and also a special crumb tray arrangement below the heating means.

U.S. Pat. No. 1,708,522: Toaster

A toaster is provided in which the articles to be toasted, such as slices of bread, are fed through the apparatus by suitable conveying means, and wherein the heating of the heating elements is started by insertion of the material to be toasted. The toaster includes conveying means for the material to be toasted and means for driving or stopping said conveyer in accordance with the presence or absence of the toaster of material to be toasted, and further includes a casing having insertion openings at different positions along the conveyer so that the length of path traveled by the bread in passing the heating means may be varied to vary.

U.S. Pat. No. 3,517,605: Bun Toaster

A compact and easily cleaned bun toaster such as for the heels and crowns of hamburger buns and the like. A conveyor confronts a toasting platen for driving buns along the surface of the conveyor to toast them. The conveyor is removable as a unit from the frame mounting the platen, thereby to expose both the conveyor and the platen for easy cleaning. The platen is movable toward and away from the conveyor to adjust the space therebetween. The platen is stepped to facilitate simultaneous toasting of bun heels and crowns of different thicknesses. The conveyor is in driven engagement only when moved into suspended engagement with the frame.

U.S. Pat. No. 3,693,536: Apparatus and Method of Toasting Bread Like Articles

An electric toasting apparatus comprised of a conveyor adapted to support articles to be toasted and having the transverse width and a preselected rate of movement in a longitudinal direction. The apparatus includes at least two radiant heater means disposed adjacent the conveyor, each arranged to provide generally uniform heating conditions across substantially the entire transverse width of the conveyor and along at least a substantial portion of the longitudinal length of the conveyor. One heater runs constantly and has a heat output to bring the articles close to the toasting point. The other is modulated to control its heat output and thus the total output of both heater means to give the desired degree of toasting. The method comprises the steps of: (a) conveying the articles past and adjacent to the first and second heater means at a uniform rate; (b) fully energizing the first heater means in an amount sufficient to bring the articles at least close to the toasting point; and (c) simultaneously energizing the second heater means to produce less than its maximum heat output, but sufficiently to fully toast the articles.

U.S. Pat. No. 3,835,760: Apparatus for Toasting Bread-Like Articles

Apparatus for toasting bread-like articles is disclosed comprising a housing providing a toasting chamber in which electrical heating elements are disposed together with an endless conveyor operable to receive and carry articles to be toasted past the heating elements. The housing has an entrance opening for introducing articles onto the conveyor and when the articles have been toasted they are discharged from the conveyor for removal from the apparatus. The housing is provided with a discharge opening in the top wall thereof and adjacent the rear wall of the housing, and a flue arrangement is provided within the housing to induce hot air in the housing to flow through the discharge opening. Flow of hot air through the flue induces ambient air to flow into the toasting chamber through the product entrance, beneath the conveyor and heating elements and thence upwardly toward the top of the chamber. A temperature sensing element is disposed in the housing in the path of ambient air flow and is responsive to the temperature sensed to cause energization and de-energization of the heating elements.

U.S. Pat. No. 4,286,509: Toasting Apparatus

An economical energy saving toasting apparatus includes a housing with an interior baffle defining a toasting chamber therein and an inlet for the introduction of the product to be toasted into the chamber. The housing also includes an outlet through which the toasted product is dispensed. A conveying assembly for conveying the product from the inlet through the toasting chamber to the outlet is also included within the housing. Mounted within the toasting chamber is a first set of resistive heating elements that are electrically connected in a circuit and continuously energized during the operation of the heating apparatus. A second set of heating elements is also included in the heating chamber and connected to a timer in order to be energized for only selected periods of time. A micro-switch is also included in the apparatus to actuate the timer and a micro-switch actuator is positioned in the inlet and adjacent to the conveying device so as to be engaged by the product prior to entry into the toasting chamber. The engagement of the product actuates the micro-switch to energize the timer and the second set of heating coils for a predetermined period of time.

U.S. Pat. No. 5,673,610: Apparatus for Conveyorized Toasting of Breads and Like Food Items An apparatus for conveyorized toasting of sandwich buns and like bread and food items simultaneously on opposite sides comprises a central heated platen with two bun transport conveyors traveling in spaced relation along opposite sides of the platen and with a pair of auxiliary heating elements disposed outwardly of the respective food transport runs of the conveyors in facing relation to the opposite sides of the platen. Each conveyor is biased toward the platen by a pair of parallel pivot arms urged by springs into pivoted engagement against the transport run of the respective conveyor to define a predetermined desirable spacing to the facing side of the platen.

U.S. Pat. No. 5,746,116: Rapid Toasting Apparatus

An improved toasting apparatus is disclosed including a variable speed conveyor belt for conveying products through the toaster; a bottom heating element positioned below the conveyor belt, the bottom heating element including variable control for controlling the amount of heat provided by the bottom heating element; a drying zone including a first plurality of upper heating elements positioned above the conveyor; a toasting zone including a second plurality of upper heating elements; and wherein the bottom heating element and the first and second plurality of upper heating elements are controlled individually and independently.

U.S. Pat. No. 5,983,785: Contact Toaster with Infinite Adjustment

A contact toaster has a housing with a product inlet, product outlet and at least one toasting chamber defined in the housing. A heated platen is mounted in the housing and has a platen surface arranged for toasting the food products. A flexible endless belt, which when rotated, is arranged to pass the food products in a toasting path along the platen between the belt and the platen. An infinite controller acts to selectively displace the belt to adjust the distance between the belt and the platen to any value between minimum and maximum distance limits to accommodate food products of different widths. A guide is situated between the belt and the infinite controller so that the controller is in contact with at least one area of the guide. The infinite controller includes a variable distance element with a cam surface which is settable to any selected point of the cam surface between minimum and maximum cam radial limits to move the guide and belt to any belt to a selected platen distance that can have any value equal to or intermediate the maximum and minimum distance limits.

U.S. Pat. No. 6,019,030: Conveyor-Type Food Product Toaster

A toaster for bread-type food products includes a housing defining at least one toasting cavity. A toasting heater is operatively associated with the cavity. An endless chain-type conveyor is provided for conveying food products through the cavity. An endless belt is disposed about the conveyor to prevent the chain-type conveyor from imprinting the food products. The belt includes a seam, and a retention portion of the belt at the seam is engaged with the conveyor to prevent slippage between the belt and the conveyor.

US Publication Number 20100139497A1: Food Heating Device

A food heating device includes a first conveyor having a first thermally-conductive belt and a second conveyor having a second thermally-conductive belt. A first platen is disposed on a first side of the first thermally-conductive belt and a second platen disposed on a first side of the second thermally-conductive belt. The first conveyor and the second conveyor are arranged and spaced to transport a food product between a second side of the first thermally-conductive belt and a second side of the second thermally-conductive belt.

US Publication Number 201000275789A1: Toaster with Removable and Adjustable Conveyors A dual-sided, conveyor toaster provides operator-adjustable conveyors that are also operator removable. The removable conveyor assemblies are chain driven and removably supported in the toaster by re-positionable mounting mechanisms embodied as either adjustable pins that engage fixed slots or adjustable slots that engage fixed pins. Fixed pins can be located on the conveyor and engage adjustable slots in the toaster; adjustable pins can be located on the toaster and engage fixed slots on the conveyor. The conveyor assemblies use non-marring plates to urge food products against the heated platen surfaces and to carry the food products across the platen.

SUMMARY OF THE INVENTION

In accordance with one aspect of the present invention, a first embodiment of a conveyor toaster includes a housing having an entry slot on one side for inserting a slice of bread, a conveying mechanism for transporting the slice of bread through the toasting chamber, at least one heating element for toasting the bread, and a second opening, or exit slot, on an opposite end of the housing for extracting the toast.

In a preferred embodiment, the conveying mechanism includes a heat resistant steel chain with upwardly pointing sharp spikes to support and advance the bread being transported. The chain moves in a horizontal plane, and is supported by a sprocket at either end. One sprocket is rotated by an electric motor having a speed control, and the other sprocket serves to maintain tension on the chain and allow the conveyor mechanism to move in an endless belt type of rotation.

It is also preferred that the housing include a pair of viewing windows on a front and rear portion thereof, so that a user may view the bread being toasted as it is being transported through the apparatus, during a toasting operation.

Various controls may be employed, in order to toast the bread according to a specific user's taste. For instance, a motor switch or knob may be used to turn the conveyor motor on and off, and may be further used to vary the speed of the conveyor. Slower conveyor speeds are used to obtain darker toast, as the bread is present within the toasting chamber for a longer period of time, and higher speeds are used for lighter toast, as the bread is present in the toasting chamber for shorter time periods. A heat switch or knob may also be used to turn on the heat source, and further, to vary the amount of heat supplied by the heating element(s), as the intensity of the heat may be varied by rotating the knob to control heat intensity. Other controls may be implemented as well. For instance, pre-set electronic controls may be included that automatically provide the desired temperatures for defrosting, warming, applying heat to a single side of a bagel or toast, or other default settings that provide any desired heating or toasting patterns. It is also contemplated that wireless controls may be implemented, so that a user may operate the toaster from his or her telephone, tablet, or the like, through the use of Bluetooth communications, wi-fi, or other suitable wireless controls.

BRIEF DESCRIPTION OF THE DRAWINGS

These and other features, aspects, and advantages of the present invention will become better understood with regard to the following description, appended claims, and accompanying drawings where:

FIG. 1 is a front view of one embodiment of a conveyor toaster;

FIG. 2 is a side view of one embodiment of a conveyor toaster; and

FIG. 3 is a cross-sectional view of the embodiment of the conveyor toaster shown in FIG. 2, along the lines 3-3.

DETAILED DESCRIPTION OF THE INVENTION

The present invention, in a first embodiment, a toaster 10 having a conveyor mechanism 12 for transporting slices of bread 14 horizontally through a toasting chamber 16, as shown in FIGS. 1-3. The toaster 10 preferably includes a housing 18 having an entry slot 20 or opening on one side thereof, for inserting a slice of bread 14 to be toasted. A conveyor mechanism 12 preferably includes a heat resistant steel chain 22 with upwardly pointing sharp spikes to support and advance the bread 14 being transported. The chain 22 moves in a horizontal plane, and is supported by a sprocket 24 at either end. One sprocket 24 is rotated by an electric motor 26 having a speed control knob 28, and the other sprocket 24 serves to maintain tension on the chain 22 and allow the conveyor mechanism 12 to move in an endless belt type of rotation. In a preferred embodiment, the conveyor 12 includes a speed control knob 28, button, or other control device, which allows a user to turn the conveyor mechanism 12 on and off, and further allows the speed of the conveyor 12 to be adjusted, as desired. The conveyor mechanism 12 delivers the toast through the toasting chamber 16 to an exit slot 42 for extraction by a user.

Slower conveyor speeds are used to obtain darker toast, as the bread 14 is present within the toasting chamber 16 for a longer period of time, and higher speeds are used for lighter toast, as the bread 14 is present in the toasting chamber 16 for shorter time periods.

At least one heating element 30 is disposed within the housing 18, and is used to provide heat for toasting the bread 14. The heating element 30, in a preferred embodiment, also includes a heat control knob 32, button, or other control device to turn the heating element 30 on and off, and further, to control the intensity of the heat generated by the heating element 30. Any suitable heating element 30 may be used, including standard heat resistant (nichrome type) wire, radiant glass tubes, ceramic coated glass, quartz rod, or the like. It is contemplated that different types of heating elements may be used in combination with one another, if desired.

Preferably, a guide rail 34 or rod is positioned longitudinally along and above the conveyor path, in order to maintain the bread 14 in a generally upright or vertical orientation. It should be understood, however, that the conveyor 12 may be made to transport the bread 14 in a horizontal position, if desired, without departing from the spirit or scope of the present invention.

In one embodiment, the housing 18 includes a window 38 on a front portion and/or on a rear portion thereof, so that a user may view the bread 14 as it is being toasted, during a toasting operation. Heat resistant glass may be used, or double paned glass, so that the temperature of the outer pane of glass does not rise to an unacceptable or dangerous level.

Various other controls may be employed, in order to toast the bread according to a specific user's taste. For instance, pre-set electronic controls 38 may be included that automatically provide the desired temperatures and timing for defrosting, warming, applying heat to a single side of a bagel or toast, or other default settings that provide any desired heating or toasting patterns. For defrosting a slice of bread, for instance, a "Defrost" button or control may be programmed to operate the conveyor 12 at a slow speed, and to operate the heating element 30 at a low heat intensity, in order to provide enough heat to defrost the bread 14 without fully toasting it. Or, the defrost button may be programmed to start the defrosting operation by providing a high heat intensity level during an early part of the operation, and then may decrease the intensity of the heat later in the operation, so that the defrosting of the bread occurs without fully toasting the bread. Other buttons may include similar default operations, so that the conveyor speed and heat intensity are coordinated, and potentially varied, at different times during the operation, to provide the optimal heating time and intensity for that specific operation. Alternatively, a user may operate the toaster 10 manually, by setting the conveyor speed and heat intensity levels, and potentially varying those levels during the toasting operation, as desired.

It is further contemplated that the conveyor toaster 10 may be user programmable, so that if a user develops her own speed and temperature levels or sequences, the user may capture those levels or sequence (consisting of speeding up or slowing down the conveyor and varying the temperature during a toasting operation), and assigning that specific sequence to a particular user programmable button 40, knob, or control. This arrangement allows a user to try different temperature levels, conveyor speeds, and even variances on speed and temperature during a toasting operation, and then to capture that specific sequence and assign that "macro" to a specific button, so that the specifically captured sequence may be exactly repeated in the future by pressing the assigned user programmable button 40 or control device.

In one embodiment, wireless controls may be implemented, so that a user may operate the toaster 10 from his or her telephone, tablet, or the like, through the use of Bluetooth communications, wi-fi, or other suitable wireless controls. Preferably, the conveyor toaster may be operated by a software application, commonly known as an "app." The app may include a timer, so that a user may place the bread 14 in the entry slot 20, and then cause the toaster 10 to begin the toasting operation at a specific time. For instance, the app may be programmed to begin the toasting operation early in the morning, so that the toast is hot and ready at the desired time for breakfast.

The app may also control the speed and heat intensity of the toasting operation in a similar manner as described above, with manual controls, default settings and controls, and may further be programmed by a user to capture a user-developed sequence, as described herein. In one embodiment, the conveyor toaster 10 may also be wirelessly linked to a home automation device that recognizes and executes verbal commands, such as an Amazon Echo, Google Home, or other similar device. In this way, a user may simply give a voice command to the Amazon Echo, for instance, and the communications link between the Echo and the toaster allows for the verbal command to be translated into digital instructions communicated from the Echo to the toaster, which then executes those commands. Many electronics devices are currently being developed to work in conjunction with these types of home automation devices, and one skilled in the art of electronics will appreciate the ease of programming electronic devices, including the present conveyor toaster, to link with these commonly available home automation devices.

To use the conveyor toaster 10, a user simply places a slice of bread into the entry slot, and either manually operates the speed and heat intensity, or selects a pre-set default button (or a user-defined button for a user specific toasting pattern), and the conveyor 12 transports the bread 14 through the toasting chamber 16 to the exit slot 42 for extraction. In a preferred embodiment, the user may override any default setting or sequence by simply operating one of the manual speed or temperature buttons. The windows 36 allow a user to watch the bread 14 as it is being toasted, so that they can adjust the speed or temperature according to their observations through the window 36. Optionally, a light or plurality of lights may be disposed within the housing 18, to provide light on the bread 14 as it is being toasted. It is contemplated that multiple slices of bread 14 may be transported through the toasting chamber 16 simultaneously, one after another, as desired.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A conveyor toaster comprising:
   a housing having a top surface, a bottom surface, a front wall, a rear wall, and two side walls, wherein a first side wall defines an entry slot for receiving a slice of bread, and wherein a second side wall defines an exit slot for extracting a slice of toast;
   said housing defining a toasting chamber on an inner portion thereof;
   a conveyor mechanism for conveying a slice of bread in a generally vertical orientation from said entry slot, through said toasting chamber, and to said exit slot, said conveyor mechanism including a motor for rotationally driving a conveyor formed into an endless loop, wherein said conveyor includes an upper surface for engaging said slice of bread and a lower surface that moves in an opposite direction from said upper surface;
   at least one heating element disposed in a horizontal orientation below said upper surface of said conveyor and within said housing;
   a speed controller for controlling the speed of said conveyor mechanism, said speed controller being positioned on a front portion of said housing;
   a heat controller for controlling the intensity of heat generated by said heating element, said heat controller being positioned on a front portion of said housing; and
   wherein said front wall includes a transparent window for viewing said bread while said bread is positioned within said toasting chamber, so that a user may control said speed controller and said heat controller during a toasting operation based on visual observations of said bread being toasted within said toasting chamber.

2. The conveyor toaster set forth in claim 1, wherein said conveyor comprises a chain rotating about a pair of sprockets, wherein one of said sprockets is driven by said motor.

3. The conveyor toaster set forth in claim 2, wherein said chain is made from heat resistant materials, and includes spikes extending outwardly therefrom for engaging and securing said slice of toast thereto for transport through said toasting chamber.

4. The conveyor toaster set forth in claim 1, further comprising at least one control button that is pre-programmed to execute specific speed and temperature levels.

5. The conveyor toaster set forth in claim 4, wherein said control button is pre-programmed to execute specific speed sequences, including increasing and decreasing speed levels of said conveyor mechanism according to pre-set parameters during a toasting operation.

6. The conveyor toaster set forth in claim 4, wherein said control button is pre-programmed to execute specific heating sequences, including increasing and decreasing heat intensity levels of said heating element according to pre-set parameters during a toasting operation.

7. The conveyor toaster set forth in claim 1, further comprising at least one user programmable button that may be programmed by a user to execute specific speed and temperature levels.

8. The conveyor toaster set forth in claim 7, wherein said user programmable button may be programmed to execute specific speed sequences, including increasing and decreasing speed levels of said conveyor mechanism according to pre-set parameters during a toasting operation.

9. The conveyor toaster set forth in claim 6, wherein said user programmable button may be programmed to execute specific heating sequences, including increasing and decreasing heat intensity levels of said heating element according to pre-set parameters during a toasting operation.

10. The conveyor toaster set forth in claim 1, wherein said conveyor toaster may be remotely operated via wireless remote control device.

11. The conveyor toaster set forth in claim 10, wherein said remote control device is selected from the group consisting of a smart phone, a tablet, a computer, or a home automation device.

12. The conveyor toaster set forth in claim 11, wherein said remote control device recognizes verbal commands, and operates said conveyor toaster based on said verbal commands.

13. The conveyor toaster set forth in claim 1, wherein said rear wall includes a transparent window.

14. The conveyor toaster set forth in claim 1, wherein said heating element is selected from the group consisting of a heat resistant wire, radiant glass tubes, ceramic coated glass, and a quartz rod.

15. The conveyor toaster set forth in claim 1, wherein said conveyor mechanism conveys said slice of bread, in a substantially vertical orientation.

* * * * *